(No Model.) 3 Sheets—Sheet 1.
R. H. YEOMAN.
FURNACE.
No. 525,399. Patented Sept. 4, 1894.
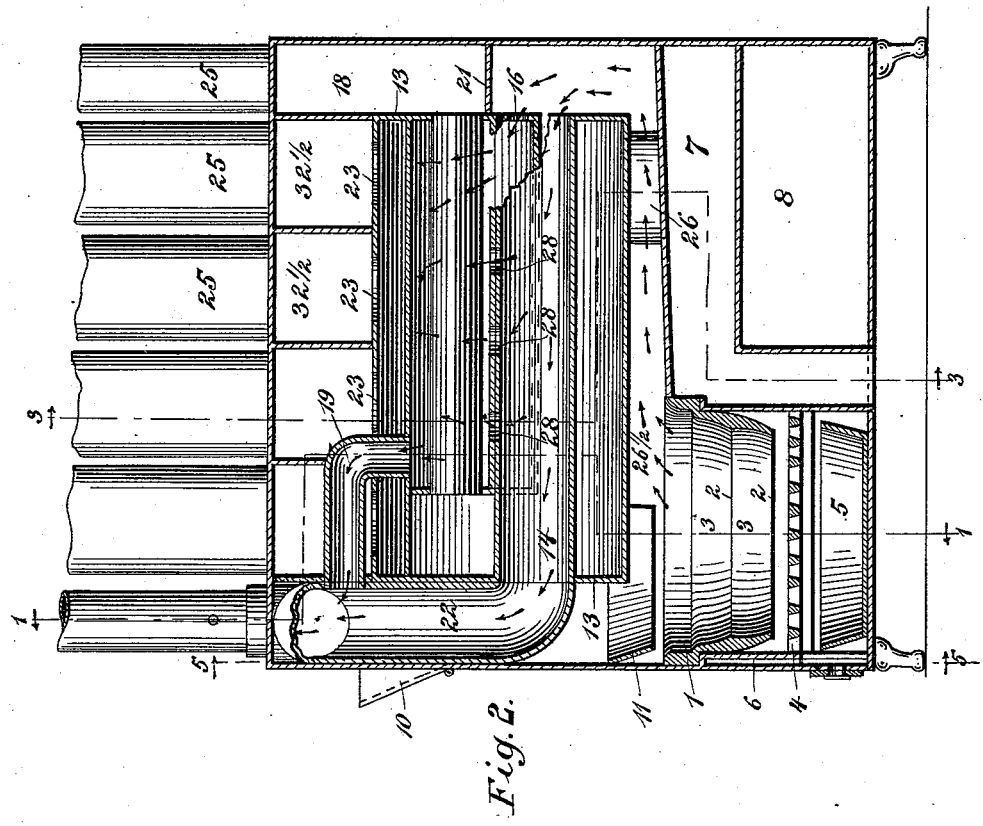
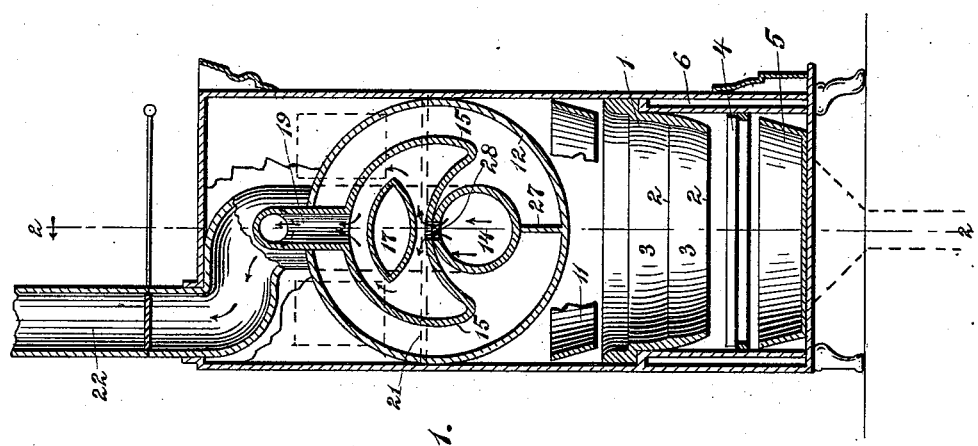
WITNESSES
M. H. Turtchell
John Cullen
INVENTOR
R. H. Yeoman
By Glascock & Co
Attorneys (No Model.)  
3 Sheets—Sheet 2.
R. H. YEOMAN.  
FURNACE.
No. 525,399.  
Patented Sept. 4, 1894.
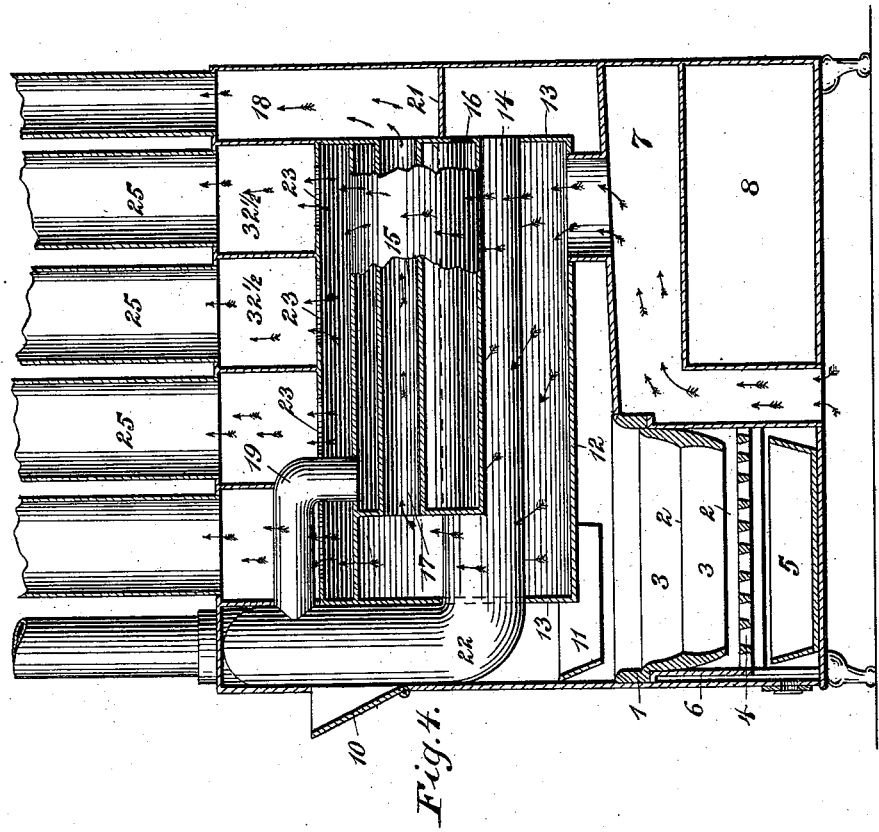
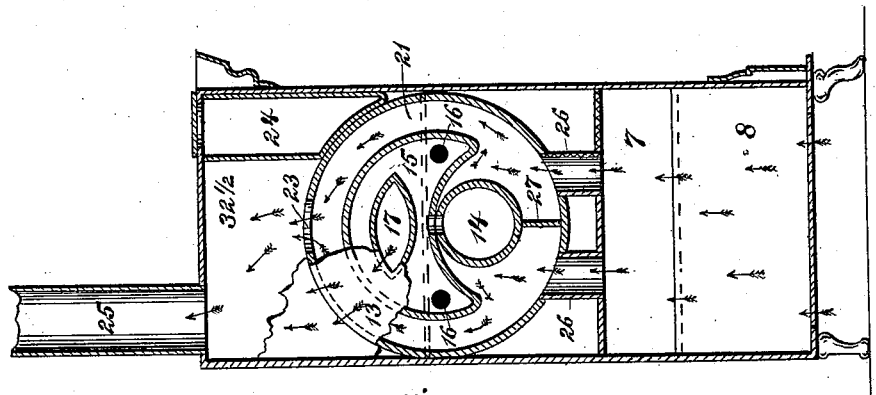
WITNESSES  
INVENTOR  
R. H. Yeoman  
By Glascock & Co  
Attorneys (No Model.) 3 Sheets—Sheet 3.
R. H. YEOMAN.
FURNACE.
No. 525,399. Patented Sept. 4, 1894.
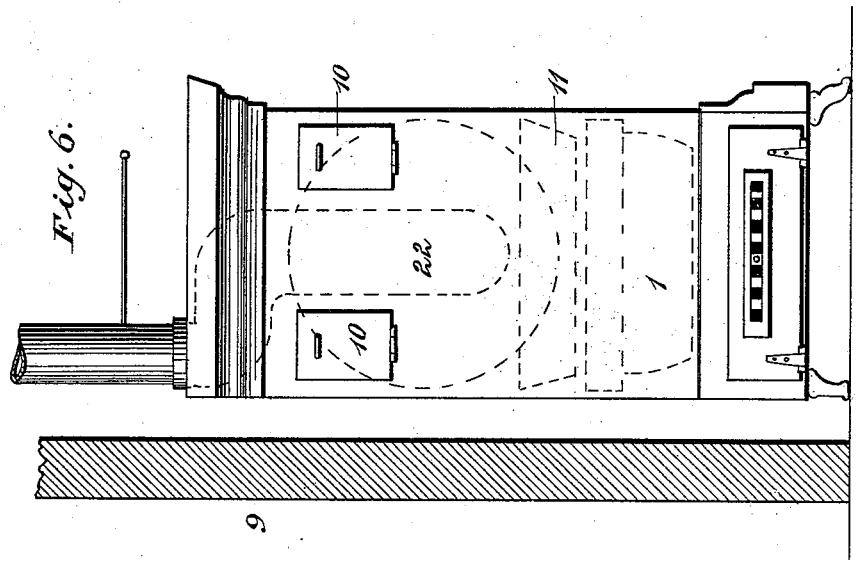
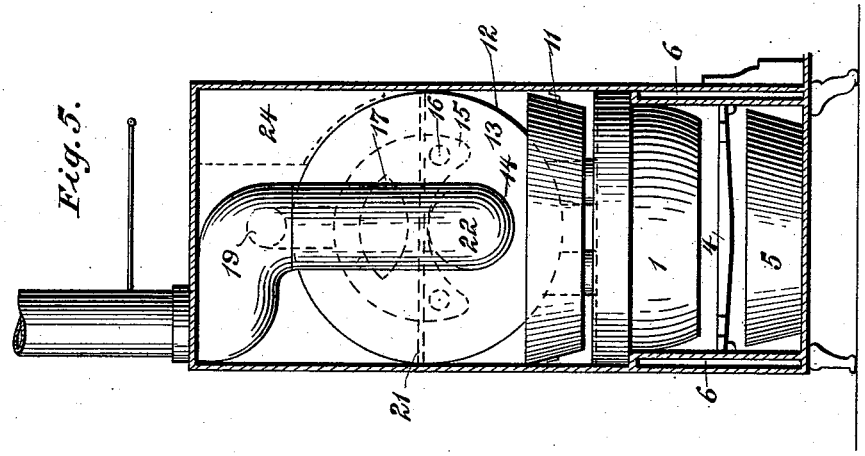
WITNESSES
M. W. Twitchell.
John Cullen.
INVENTOR
R. H. Yeoman
By Glascock & Co.
Attorneys

UNITED STATES PATENT OFFICE.

ROBERT HENRY YEOMAN, OF OMAHA, NEBRASKA.

FURNACE.

SPECIFICATION forming part of Letters Patent No. 525,399, dated September 4, 1894.

Application filed May 5, 1893. Serial No. 473,164. (No model.)

*To all whom it may concern:*

Be it known that I, ROBERT HENRY YEOMAN, a citizen of the United States, residing at Omaha, in the county of Douglas and State of Nebraska, have invented a certain new, useful, and valuable Improvement in Furnaces, of which the following is a full, clear, and exact description.

My invention has relation to furnaces adapted to heat air and discharge it without bringing it in contact with the flame.

Said invention consists of the novel construction and arrangement of its parts as hereinafter described.

In the accompanying drawings:—Figure 1, is a transverse sectional view of my invention cut on the line 1, 1, of Fig. 2. Fig. 2, is a longitudinal sectional view cut on the line 2, 2 of Fig. 1, showing the passage of the heat and smoke. Fig. 3, is a transverse sectional view cut on the line 3, 3, of Fig. 2. Fig. 4, is a longitudinal sectional view showing the passage of the air. Fig. 5, is a transverse sectional view cut on the line 5, 5, of Fig. 1. Fig. 6, is an end view of the furnace.

The furnace consists of the fire pot 1, which is preferably made of fire brick. Said fire pot is lodged in a suitable recess made in the frame work of the furnace. The inner surface of the said fire pot consists of a series of parallel ridges 2, and intermediate depressions 3. The outlet of the said fire pot is smaller than the inlet. The said ridges and the depressions tend to keep the fuel from slipping through the said fire pot before it is consumed.

Immediately below the fire pot 1, is a suitable grate 4, and below the said grate is an ash pan 5; or instead of an ash pan the furnace may have a chute as indicated by the dotted lines in Fig. 1, by means of which the ashes may be conveyed into a room below. The said ash pan 5, the grate 4, and the lower part of the fire pot 1, are surrounded by the air chamber 6. The back part of the said chamber having an extension 7, (see Fig. 2.) Under the extension 7, is a compartment 8, forming a kind of an oven which can be used for drying purposes. The said furnace is preferably raised several inches from the floor and its back part is preferably several inches from the wall 9, see Fig. 6 The coal or other fuel, is fed into the furnace through the doors 10 10 near the top end thereof. The fuel falls upon the chute 11, which conveys it into the fire pot 1, just below. Located in about the middle of the said furnace and having one end above a part of the fire pot 1, is a horizontal cylinder 12, which runs nearly the entire length of the furnace and is provided at each end with the head 13, 13. The diameter of the outer periphery of the said cylinder is equal to the width between the inner oblique faces of the perpendicular sides of the furnace. In the said cylinder 12, is a passage 14, the ends of which terminate at perforations in the cylinder heads 13, 13. Said cylinder 12 is provided with suitable air passages 23.

Immediately over the passage 14, is a crescent shaped chamber 15, which runs nearly the entire length of the cylinder 12, one end of the said chamber abutting against one of the heads 13, having the upper periphery abutting the opposite head 13. The said rear cylinder head 12 is provided with the perforations 16, 16, which lead into the said chamber 15, located inside of the chamber 15 is a passage 17. Said passage 17 has both ends open and is shaped generally elliptical. The said passage 17 connects with the distributing chamber 18. The crescent shaped chamber 15 is provided with an outlet 19, which is connected at perforation in the top at the opposite end from the perforations 16, 16. A diaphragm 21 extends across the furnace just behind the cylinder 12 and above the perforations 16, 16 and the entrance to the passage 14. A flue 22 is connected with the front end of the passage 14, and the outlet 19 discharges into said flue. A tank 24, for heating water and provided with suitable means for drawing the same off is located over the cylinder 12. The flues 25 connect with the chambers 23½. The furnace is provided with the cold air inlets 26, which conduct the cold air from under the furnace into the cylinder 12, and discharges the said air under the crescent shaped chamber 15. The partition 27 prevents the cold air from entering one inlet 26 and going out at the other. The crescent shaped chamber 15 is connected with the top of the passage 14 by the perforations 28.

The heat and smoke from the fire in the fire pot 1 passes through the passage 26½, see Fig. 2, to the rear part of the apparatus then it ascends and is forced by the diaphragm 21 (which extends all the way across the furnace) into the passage 14, and a part of the heat and smoke is also forced through the perforations 16, 16 into the chamber 15. Some of the smoke and heat passes from the passage 14 into the chamber 15, through the perforations 28. The heat and smoke in the chamber 15, after passing around the passage 17, is discharged through the outlet 19. The heat and smoke which passes through the passage 14 and enters the flue 22, is discharged from the furnace.

When the cold air enters the furnace through the inlet 26, it strikes under the crescent shaped chamber 15 and becomes heated. The air ascends around said chamber and passes out through passage 23, a portion passes forward and enters the passage 17, and from thence passes through into the chambers 18 and 23½, and from thence enters the flues 25, which convey it to the chamber above. It will be observed that the cold air in its passage from the inlets 26 to the distributing chambers 18 and 23½, is surrounded on all sides by heated surfaces. Thus the air becomes thoroughly heated before it is discharged.

Having described my invention, what I claim as new, and desire to secure by Letters Patent, is—

1. In an air heating furnace a horizontal cylinder, running nearly the entire length thereof and having in each end a head, and having suitable air outlets; a heat passage extending the entire length of the said cylinder and terminating at each end at perforations in the heads of said cylinder; a crescent shaped chamber located in said cylinder just above the heat passage, said chamber having the points of the crescent extending downward, and suitable perforations in the cylinder heads leading into the said chambers; a passage located in said crescent chamber and having connection with the interior of the cylinder and a heat distributing chamber; cold air inlets leading into the cylinder under the crescent chamber, substantially as described.

2. In an air heating furnace, an air containing cylinder having located therein a cylindrical heat passage; an independent crescent shape chamber located above the heat passage, said chamber having the points of the crescent extending downward, said heat passage and chamber being connected by suitable passages, as set forth.

3. In an air heating furnace, an air containing cylinder having located therein a heat passage, emptying at one end into a flue; a heat containing chamber located above the said passage, an air passage leading through the said heat containing chamber, and an outlet leading from the said heat containing chamber into the said flue, as set forth.

In testimony whereof I affix my signature in presence of two witnesses.

ROBERT HENRY YEOMAN.

Witnesses:
LUTHER DRAKE,
BEN B. WOOD.